(No Model.)

J. VOM HOFE.
FISHING REEL.

No. 430,022. Patented June 10, 1890.

Attest.
C. W. Benjamin.
Benjamin Birkholz.

Julius vom Hofe
Inventor.
By Henry P. Wells
his Attorney.

UNITED STATES PATENT OFFICE.

JULIUS VOM HOFE, OF BROOKLYN, NEW YORK.

FISHING-REEL.

SPECIFICATION forming part of Letters Patent No. 430,022, dated June 10, 1890.

Application filed January 4, 1890. Serial No. 335,875. (No model.)

*To all whom it may concern:*

Be it known that I, JULIUS VOM HOFE, a citizen of the United States, and a resident of the city of Brooklyn, county of Kings, and State of New York, have invented a new and useful Improvement in Fishing-Reels, of which the following is a specification.

Heretofore drags for fishing-reels have been made by interposing a spring, rigidly fastened at one end, between the side plate of the reel and the contiguous flange of the spool. This spring has been worked by a button or screw in such a manner as to cause it to rub against the inner surface of the flange of the spool of the reel by forcing the spring in that direction, and it has been drawn out of action by reversing the process. One objection to this form of drag is that it makes the efficient end of the spring so short that if the flange of the spools runs at all out of true the drag offers an uneven resistance and makes the motion of the spool jerky, which is a serious defect.

My invention is intended to meet and overcome this difficulty, and furnish a drag of cheaper and more efficient construction.

Figure 1:
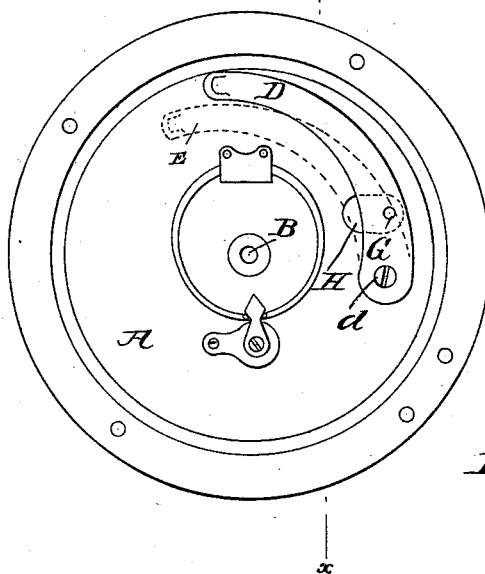
Figure 2:
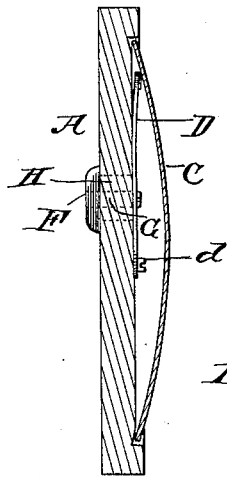

In the drawings forming part of this specification, Figure 1 shows a plan view of the inner face of a side plate of a reel with my drag attached; Fig. 2, a sectional view on the line *x x* of Fig. 1.

In the drawings, A represents a side plate of a reel; B, the center upon which the axle of the spool revolves, and C that flange of the spool against the inner surface of which my drag D bears.

My drag D consists of a spring bent in the usual manner, so that the natural position of its free end is away from the side plate A and toward the flange C. It is pivoted at and movable on *d*, so that it may be placed either in the position shown at D, Figs. 1 and 2, or in that shown by dotted lines at E, Fig. 1, or in any intermediate position. The drag D is moved and controlled by a stud F, Fig. 2, which is connected with said drag by a pin G, rigidly secured to said drag. By moving the stud F the pin G is moved through the slot H in the side plate A, and thus the drag G is placed in the desired position. The friction of the stud F against the side plate A is sufficient to retain the drag in the position in which it may be placed.

When the drag is in the position indicated by D, Figs. 1 and 2, it produces its maximum effect. When at the position indicated by E in Fig. 1, its free end, owing to the bell shape of the flange C, is out of contact and the drag is inoperative. By adjusting the position of the stud F it is apparent that pressure of the drag may also be adjusted to offer any desired degree of resistance up to its maximum.

Having now described my invention, what I claim as new, and desire to secure by Letters Patent, is—

1. The combination, with the side plate of a fishing-reel, of flange of the spool of said reel, a spring-drag pivoted to the side plate at one extremity and free at the other, and means for moving said spring-drag on its hinge, as and for the purpose described.

2. The side plate of a fishing-reel, the flange of the spool of said reel, a spring-drag pivoted to the side plate at one extremity and free at the other, in combination with a stud on the exterior surface of said side plate, the whole so arranged that by moving said stud the pressure of the drag may be adjusted, as and for the purpose described.

In testimony that I claim the foregoing as my invention I have signed my name, in presence of two witnesses, this 26th day of December, 1889.

JULIUS VOM HOFE.

Witnesses:
HENRY P. WELLS,
A. C. AUBERY.